US012434948B2

(12) United States Patent
Artoni et al.

(10) Patent No.: US 12,434,948 B2
(45) Date of Patent: Oct. 7, 2025

(54) STABILIZED MACHINE

(71) Applicant: ALMAC S.P.A., Guastalla (IT)

(72) Inventors: Andrea Artoni, Luzzara (IT); Lorenzo Dosi, Parma (IT)

(73) Assignee: ALMAC S.P.A., Guastalla (IT)

( * ) Notice: Subject to any disclaimer, the term of this patent is extended or adjusted under 35 U.S.C. 154(b) by 787 days.

(21) Appl. No.: 17/695,274

(22) Filed: Mar. 15, 2022

(65) Prior Publication Data

US 2022/0297988 A1 Sep. 22, 2022

(30) Foreign Application Priority Data

Mar. 17, 2021 (IT) ........................ 102021000006392

(51) Int. Cl.
*B66C 23/80* (2006.01)
*B66C 13/20* (2006.01)
*B66F 11/04* (2006.01)

(52) U.S. Cl.
CPC .............. *B66C 23/80* (2013.01); *B66C 13/20* (2013.01); *B66F 11/046* (2013.01); *B66F 11/04* (2013.01)

(58) Field of Classification Search
CPC ......... B66C 23/80; B66C 23/78; B66C 13/20; B66F 11/046; B66F 11/04; E02F 9/085; B60D 1/66
USPC ....................................... 182/63.1; 280/763.1
See application file for complete search history.

(56) References Cited

U.S. PATENT DOCUMENTS 5,431,240 A * 7/1995 Merritt .................. B66F 11/046 180/9.1
10,752,479 B2 * 8/2020 Iotti ........................ B66C 23/80
10,843,909 B2 * 11/2020 Iotti ........................ B66C 23/80
2016/0024751 A1 * 1/2016 Iotti .......................... B60S 9/02 280/765.1
2016/0039648 A1 * 2/2016 Magni ................... B66F 9/0655 414/687
2021/0009388 A1 1/2021 Lutzeyer

FOREIGN PATENT DOCUMENTS

CN 210594988 U 5/2020
KR 101858537 B1 5/2018

* cited by examiner

*Primary Examiner* — Anita M King
(74) *Attorney, Agent, or Firm* — FisherBroyles, LLP; Roger L. Browdy; Ronni S. Jillions

(57) ABSTRACT

A stabilized machine including a self-propelled base frame movably supported by a motorized ground support arrangement, a motorized turntable rotatably supported on top of the support plane of the base frame, an elevating arm articulated to the turntable and at a free end adapted to be fixed to an operating arrangement, stabilizers each rotatably associated with the base frame about an axis of oscillation lying on a plane orthogonal to the axis of rotation of the turntable, alternatively between a working position supported on the ground in addition to or as an alternative to the support arrangement, and a rest position that is raised off the ground, and control system comprising sensors, one for each of the stabilizers. Each sensor is configured to detect a first parameter indicative of an inclination of the respective stabilizer about its axis of rotation, and an electronic control unit operatively coupled to the sensors.

6 Claims, 13 Drawing Sheets

FIG.14
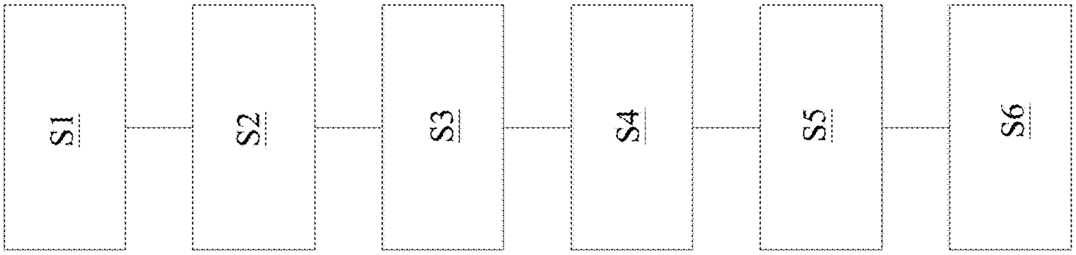
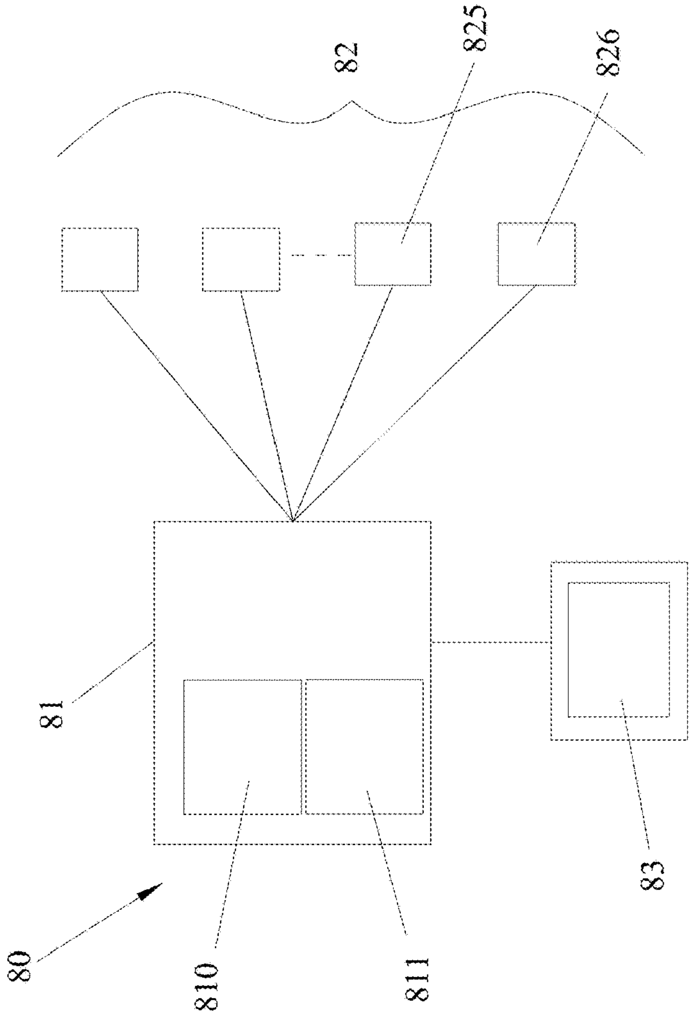
FIG.13

STABILIZED MACHINE

TECHNICAL FIELD

The present invention relates to a stabilized machine, for example a mobile elevating work platform (AWP) or a stabilized crane (preferably a stabilized mini-crane, so-called "spider crane").

More particularly, a stabilized machine, such as a mobile elevating work platform, also known as aerial work platform, tracked and stabilized, i.e. fitted with stabilizers, and/or a mobile stabilized crane, tracked and stabilized, i.e. fitted with stabilizers.

PRIOR ART

As is well known, mobile stabilized elevating work platforms (AWPs), commonly referred to as "Spiders", are essentially platforms classified, according to European, Canadian, US and Australian regulations (EN280, NSI/SAIA A92.20-2018, CAN/CSA-B354.6:17, AS/NZS 1418.10:2011) as Group B and Type 1. In particular, they are mobile elevating work platforms, usually tracked, in which, during operation at height of the arm, the vertical projection of the centre of gravity of the free end of the arm may extend beyond the tilting line of the frame. Therefore, apart from their transport configuration, in which the arm is centred along the longitudinal axis of the tracks and retracted, i.e. it is placed at a minimum height above the ground (which may not exceed 3 m in height), these machines may be used to raise the arm to the desired working height only after they have been suitably stabilized, i.e. only after all the stabilizers (generally four in number) have been brought into contact with the ground and the frame supporting the arm has been levelled.

The purpose of the stabilizers in these known machines is to extend the ground support area by placing themselves at the vertices of a virtual rectangle of ground support, so that the lateral space occupied by the stabilized machine, i.e. by the stabilizers when extended, is between 2.5 m and about 4 m.

In this way, it is possible to ensure that the arm moves within a certain working volume that prevents the machine from tipping over.

Moreover, almost all the machines of this type known on the market, according to the requirements of manufacturers and users, are designed so that (under transport conditions) they can pass through a door of standard dimensions (i.e. with a minimum width of 800 mm).

Also stabilized cranes have similar requirements, i.e. they have a self-propelled base frame on motorized tracks which supports an articulated arm for lifting loads and is provided with stabilizers for ground support.

Generally, in order to use aerial work platforms or cranes it is necessary to first stabilise the base frame on the ground, for example by lowering the stabilizer feet so that they rest on the ground and support the base frame, which once it is levelled is such that the axis of rotation of the turntable is in a vertical position.

With the base frame thus stabilized, it is then possible to extend and/or incline and/or rotate the arm within a certain operating volume, so as to bring the free end of the arm to a desired working position at height.

The operating volume of the arm is defined a priori on the basis of the minimum ground support area (i.e. the aforementioned rectangle) defined by the stabilizers. In practice, in order for the machine to operate safely, the manufacturers of such machines determine the minimum ground support area, defined with the stabilizers lowered to their lower end of stroke, and on the basis of this they determine the maximum working volume within which the arm can move safely. There are also stabilized machines (for example, platforms and/or cranes) for which the stabilizers can be oriented around axes orthogonal to the support plane, so as to define a plurality of ground support rectangles having different conformations. Also in this case, however, for each configuration that the support feet can assume, a maximum working volume is defined within which the arm can safely move, which is defined on the basis of the minimum ground support area, defined with the stabilizers lowered to their lower end of stroke in each configuration.

A need felt in the sector is that of increasing the potential use and admissible performance of this type of machine.

DISCLOSURE OF THE INVENTION

An object of the present invention is to solve such requirements of the prior art, with a simple, rational and low-cost solution.

In particular, an object of the present invention is to allow to increase the working volume of the arm allowed by the stabilized machine, under those circumstances and conditions of ground support of the stabilizers that allow it.

Such objects are achieved by the characteristics of the invention given in the independent claim. The dependent claims outline preferred and/or particularly advantageous aspects of the invention.

The invention, particularly, makes available a stabilized machine (e.g., a stabilized work platform or a stabilized crane) comprising;

- a self-propelled base frame movably supported by a motorized ground support arrangement and provided with an upper support plane;
- a motorized turntable supported on top of the support plane of the base frame and rotatable with respect to an axis of rotation orthogonal to the support plane;
- an elevating arm, one first end of which is articulated to the turntable and one second opposed free end of which is adapted to be fixed to an operating arrangement;
- a plurality of stabilizers each of which is rotatably associated with the base frame about a (single) axis of oscillation lying on a plane orthogonal to the axis of rotation of the turntable, alternatively between a working position, in which it is supported on the ground in addition to or as an alternative to the support arrangement, and a rest position, in which it is raised off the ground;
- a control system comprising a plurality of sensors, one for each of the stabilizers, wherein each sensor is configured to detect a first parameter indicative of an inclination of the respective stabilizer about its axis of rotation, and an electronic control unit operatively coupled to the plurality of sensors.

Thanks to this solution, it is possible to monitor the inclination of each stabiliser, thus being able to define a real or actual ground support area, for each working configuration of the stabilized machine and, therefore, being able to define, for each working configuration assumed by the stabilizers, a suitable volume of movement of the elevating arm.

In particular, the electronic control unit can be configured to:

- measure a value of said first parameter indicative of each stabiliser, when the relative stabilizer is stationary in a working position; and
- check at least one operational parameter (i.e. define a maximum permissible value for that operational parameter), chosen from the set among elevating arm extension stroke, elevating arm articulation arc, elevating arm rotation arc and combinations thereof, based on the measured values of the first indicative parameter.

Thanks to this, it is possible to adapt the (maximum permissible value for this) selected operational parameter as a function of the real working position assumed by the stabilizers.

In particular, it is possible to increase the safe working volume of the elevating arm where the working positions of the stabilizers define a larger ground support zone/area (e.g. in very favourable support configurations, such as support on a flat ground and/or in obstacle-free areas), but—at the same time—to dynamically adapt and thus reduce the safe operating volume of the elevating arm where the working positions of the stabilizers define a more limited ground support zone/area (e.g. in less favourable support configurations, such as the support on inclined planes and/or limited by obstacles).

Advantageously, the electronic control unit can be configured to:

- determine an actual value of a second parameter indicative of a ground support area defined by the stabilizers or by the stabilizers and the ground support arrangement as a function of the measured values of the first indicative parameter; and
- determine at least a maximum value of the operational parameter based on the actual value determined.

According to one aspect of the invention, each sensor may be an angle sensor, configured to detect an absolute inclination of the respective stabiliser.

Alternatively, each sensor may be a position sensor, configured to detect a relative position between a cylinder and a rod of a jack driving the respective stabiliser.

Advantageously, then, each stabilizer (or related actuator) may comprise a pressure sensor operatively connected to the electronic control unit, wherein the electronic control unit is configured to detect the attainment of a working position based on a signal received from the pressure sensor.

Thanks to this solution, the stabilized machine can have a redundant safety system to determine that the single stabilizer is in a working position (i.e. it is supported on the ground and supporting the machine with the support arrangement raised off the ground).

BRIEF DESCRIPTION OF THE DRAWINGS

Further characteristics and advantages of the invention will become clear from reading the following description provided by way of non-limiting example, with the aid of the figures illustrated in the accompanying tables.

FIG. 13 is a diagram of a control system of the machine stabilized according to the invention.

FIG. 14 is a flowchart of a control loop of the machine stabilized according to the invention.

BEST MODE OF THE INVENTION

With particular reference to such figures, a stabilized machine, preferably an elevating work platform (AWP), more particularly, a mobile elevating work platform, also known as aerial work platform, tracked and stabilized, for example of a self-propelled type or a stabilized crane, commonly known as a "spider crane", has been globally referred to as 10.

The machine 10 comprises a base frame 20, which for example is defined by a substantially parallelepiped (rigid) body, for example with an elongated base along a longitudinal axis, for example rectangular in shape, preferably contained in a casing.

The base frame 20 comprises, for example, a lower surface 21 intended to face the ground S, in operation, an opposed upper surface 22 facing upwards.

The upper surface 22 comprises a planar portion defining a support plane.

For example, the base frame 20 further comprises two longitudinal sidewalls, one of which is right and one of which is left, and two opposed heads, one of which is front and one of which is rear (in the direction of advancement of the machine 10 on the ground S).

Figure 1:
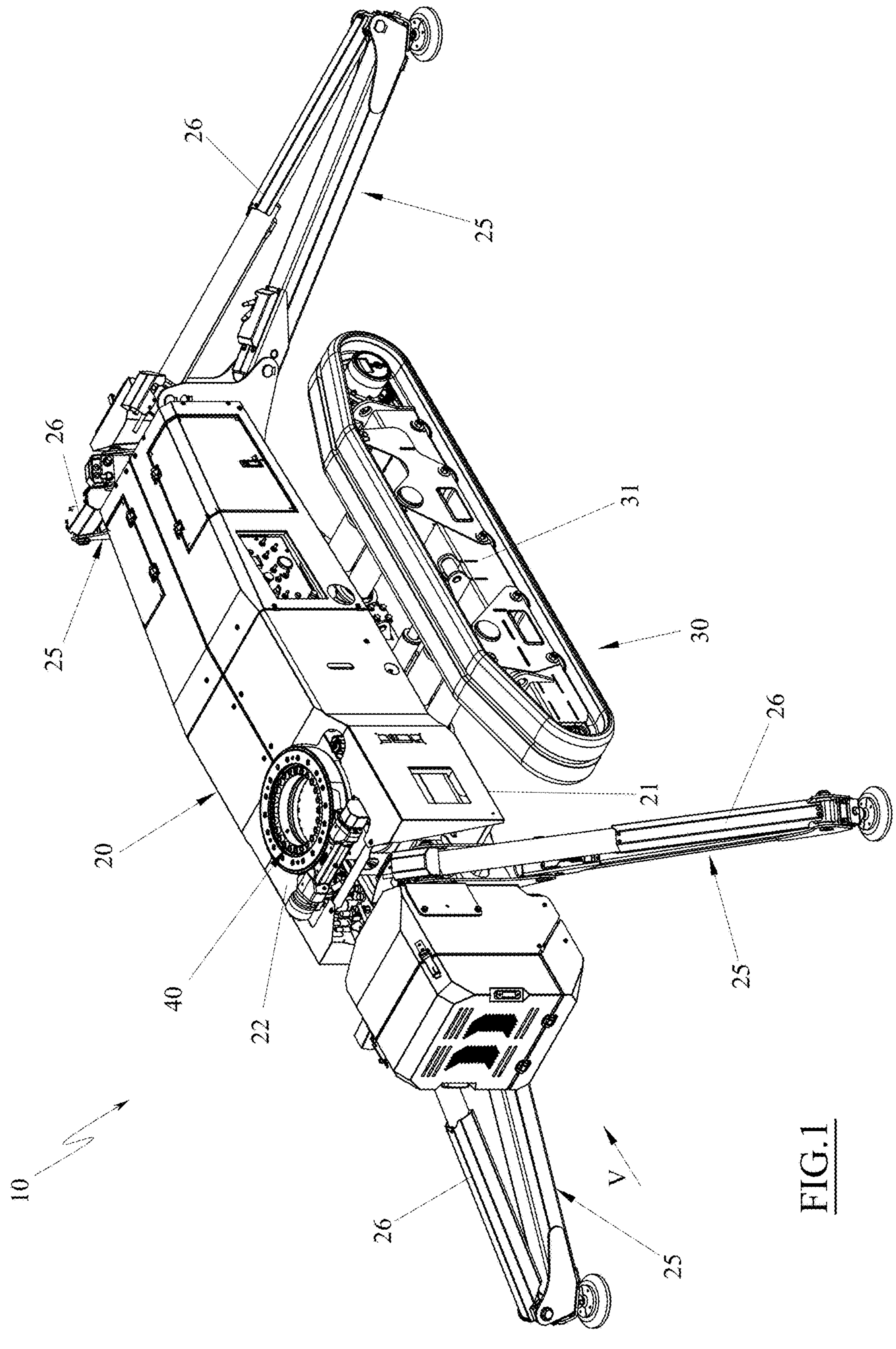
FIG. 1 is an axonometric view of a machine stabilized according to the invention, in which the elevating arm has been removed for greater intelligibility's sake of the drawings.

In the present discussion, by right and left, respectively, it is intended the right and left side of the machine 10 with respect to a view of the same according to the direction V of FIG. 1.

The machine 10 further comprises a motorized ground support arrangement 30, for example defined by at least one pair of motorized track arrangements 31,32 associated with opposite parts of the base frame 20 for the support on the ground S of the same.

In practice, the track arrangements 31,32 define the ground support S of the machine 10 (keeping suspended the base frame 20, for example raised from the ground S, so that the lower surface 21 is separated from the ground S by a first non-zero distance, for example fixed) and allow the movement of the same on the ground S.

In the preferred embodiment shown in the figures, each of the track arrangements 31 and 32 is, preferably, driven independently of each other.

Preferably, the machine 10 comprises a right track arrangement 31 and a left track arrangement 32, each of which is individually associated with the base frame 20, for example movably with respect thereto, as will be better described below. In particular, by a right and left arrangement it is understood as being specular with respect to the longitudinal median plane of the base frame 20 orthogonal to the upper surface 22 thereof (e.g., with respect to an advancement or backward direction imposed by the elements of support 30 to the same machine on the ground).

The right track arrangement 31 is, therefore, proximal (and parallel) to the right sidewall and the left track arrangement 32 is proximal (and parallel) to the left sidewall.

Each track arrangement 31 and 32, in particular, comprises a train of sprockets, at least one of which is driven by a respective motor, adapted to drive in rotation a flexible member closed on itself into a ring, for example made of rubber, the lower branch of which defines a (large) longitudinal ground support surface S. In practice, the longitudinal ground support surfaces S of the track arrangements 31 and 32 are coplanar with each other and, preferably, are placed at a lower level than the lower surface of the base frame 20.

The longitudinal axis of the longitudinal support surface defined by each track arrangement 31 and 32 is substantially parallel to the prevailing direction of the base frame 20 (i.e., the longitudinal axis A) and defines the advancement or backward direction (in a straight line) of the machine 10.

The machine 10 comprises one or more stabilizers 25, which are configured to stabilise the ground support S of the machine, for example by enlarging the ground support area with respect to the ground support area defined by the track arrangements 31 and 32 (both when they are in their approached position and when they are in their distanced position).

For example, the stabilizers 25 are individually movably associated with the base frame 20.

Preferably, each of the stabilizers 25 is rotatably associated with the base frame 20 with a possibility of oscillating about a respective (single) axis of oscillation, which is parallel to the support plane defined by the upper surface 22.

In particular, each stabilizer 25 is configured to be switchable, alternatively, between at least one working position (shown in the figures), in which the stabilizer 25 is supported on the ground S (for example so as to be added to or replace the ground support S defined by one or both of the track arrangements 31 and 32), moving to a lower level of the lower surface 21 of the base frame 20 (and/or to the lower surface of the track arrangements 31,32), and a rest position (not shown), in which it is raised off the ground, for example it is arranged at a higher height than the lower surface 21 of the base frame 20, preferably but not limited to a higher height of the upper surface 22.

Essentially, when one or more of the stabilizers 25 is in a working position, one or each of the track arrangements 31 and/or 32 is raised off the ground S, i.e., the lower surface 21 of the base frame 20 is moved from a second distance above the ground greater than the first distance.

Figure 2:
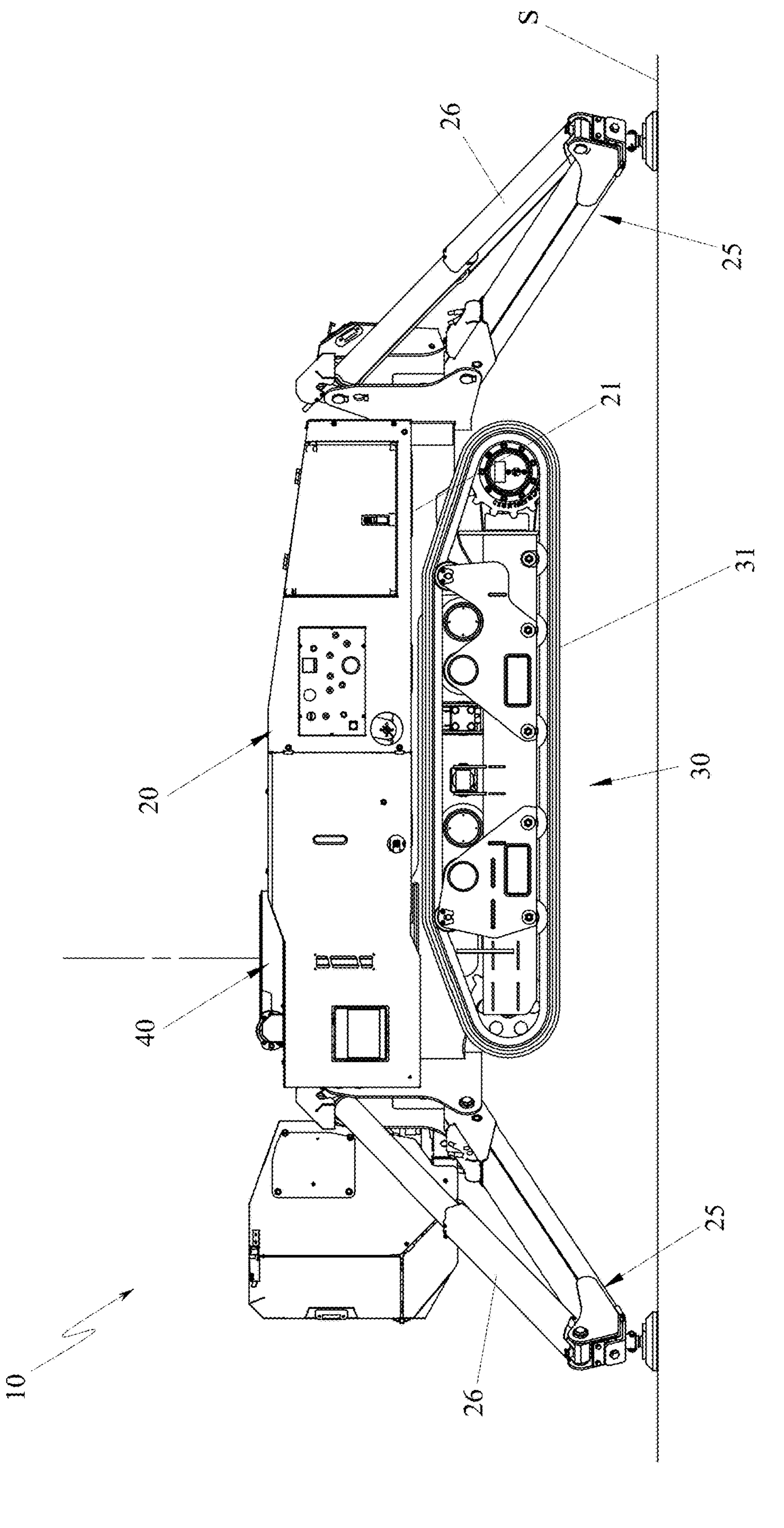
FIG. 2 is a side view from the right of FIG. 1, with the stabilizers in a lower limit working position.
Figure 3:
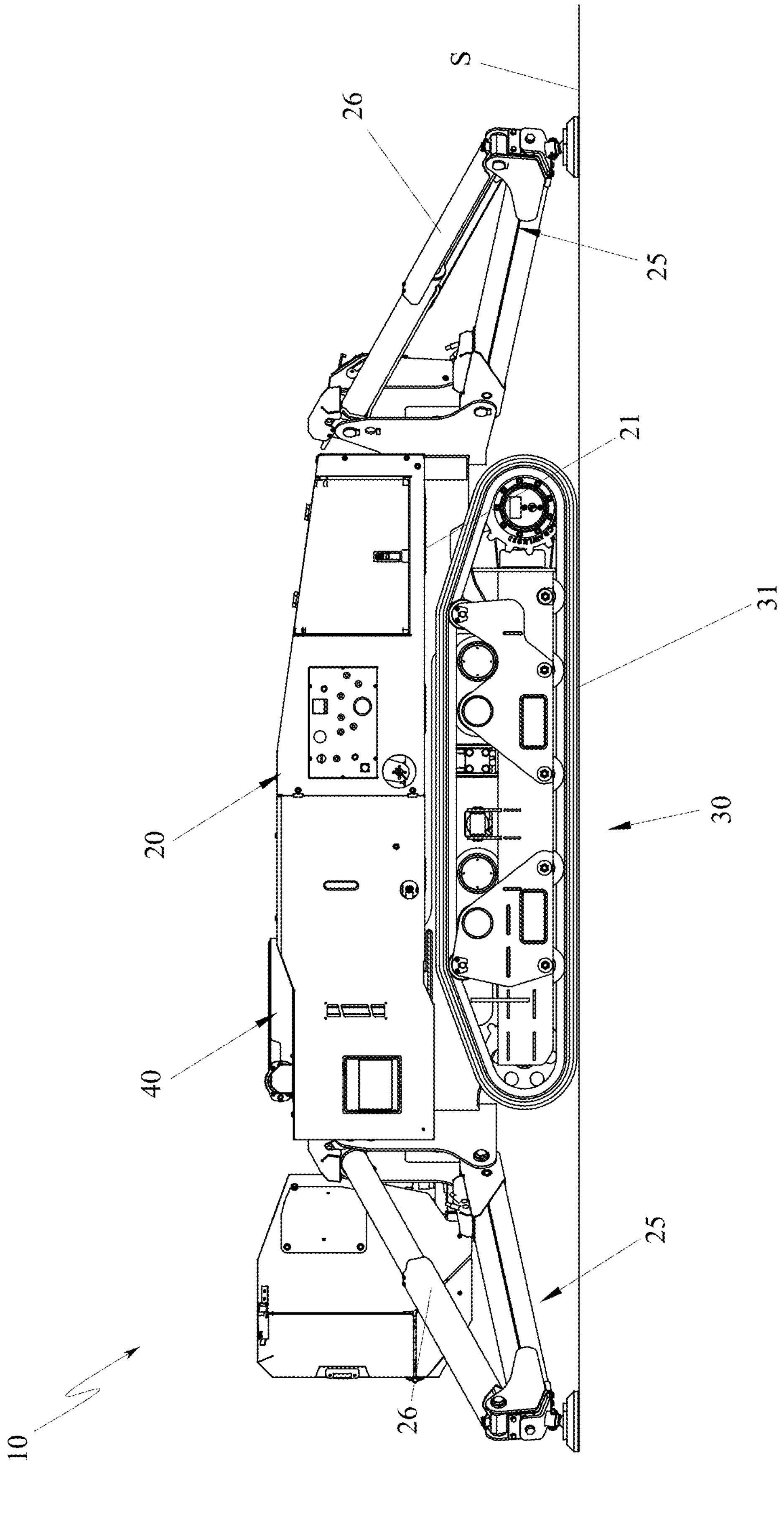
FIG. 3 is a side view from the right of FIG. 1, with the stabilizers in an upper limit working position.
Figure 4:
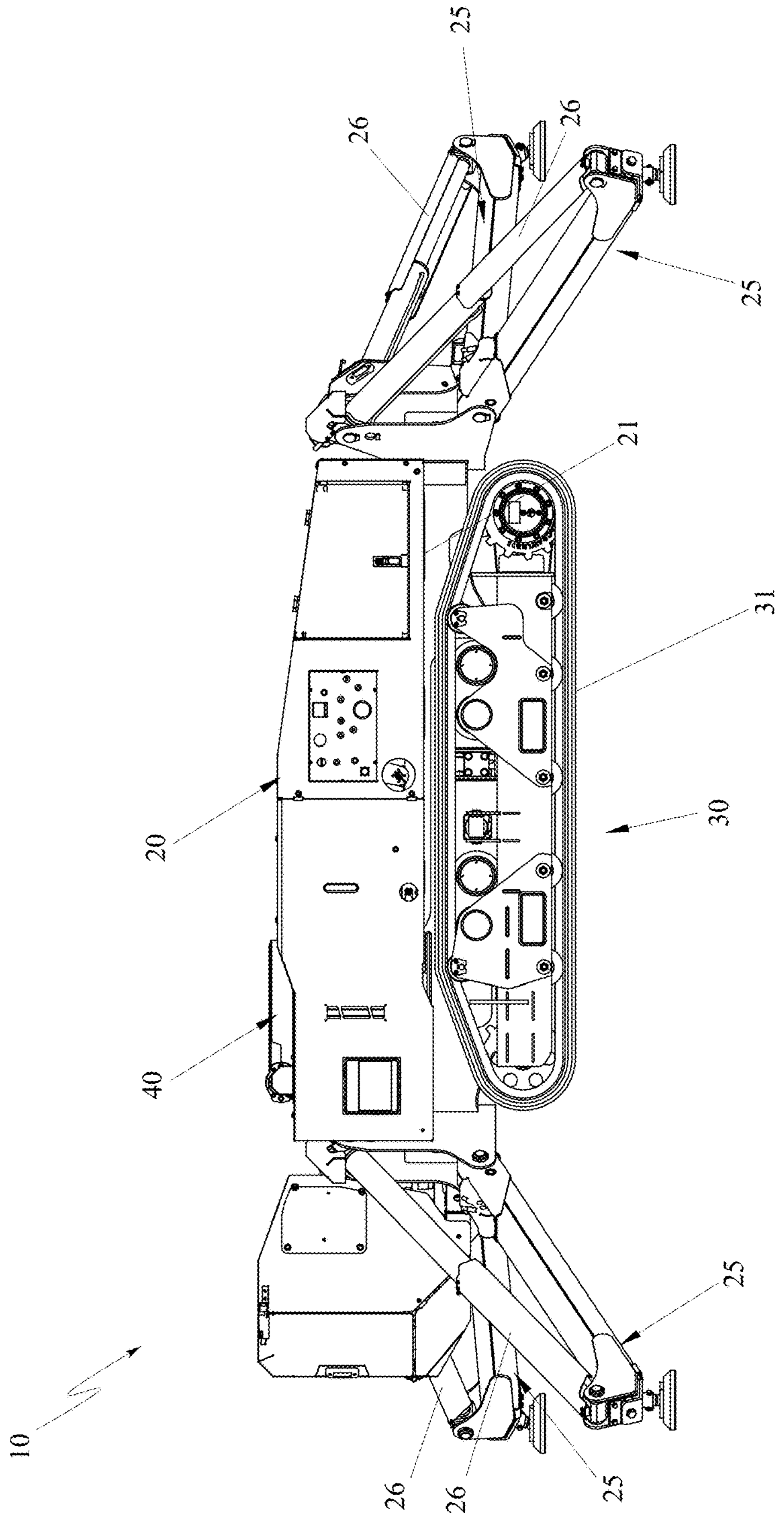
FIG. 4 is a side view from the right of FIG. 1, with the stabilizers in a working position that is intermediate between the lower limit working position and the upper limit working position.
Figure 5:
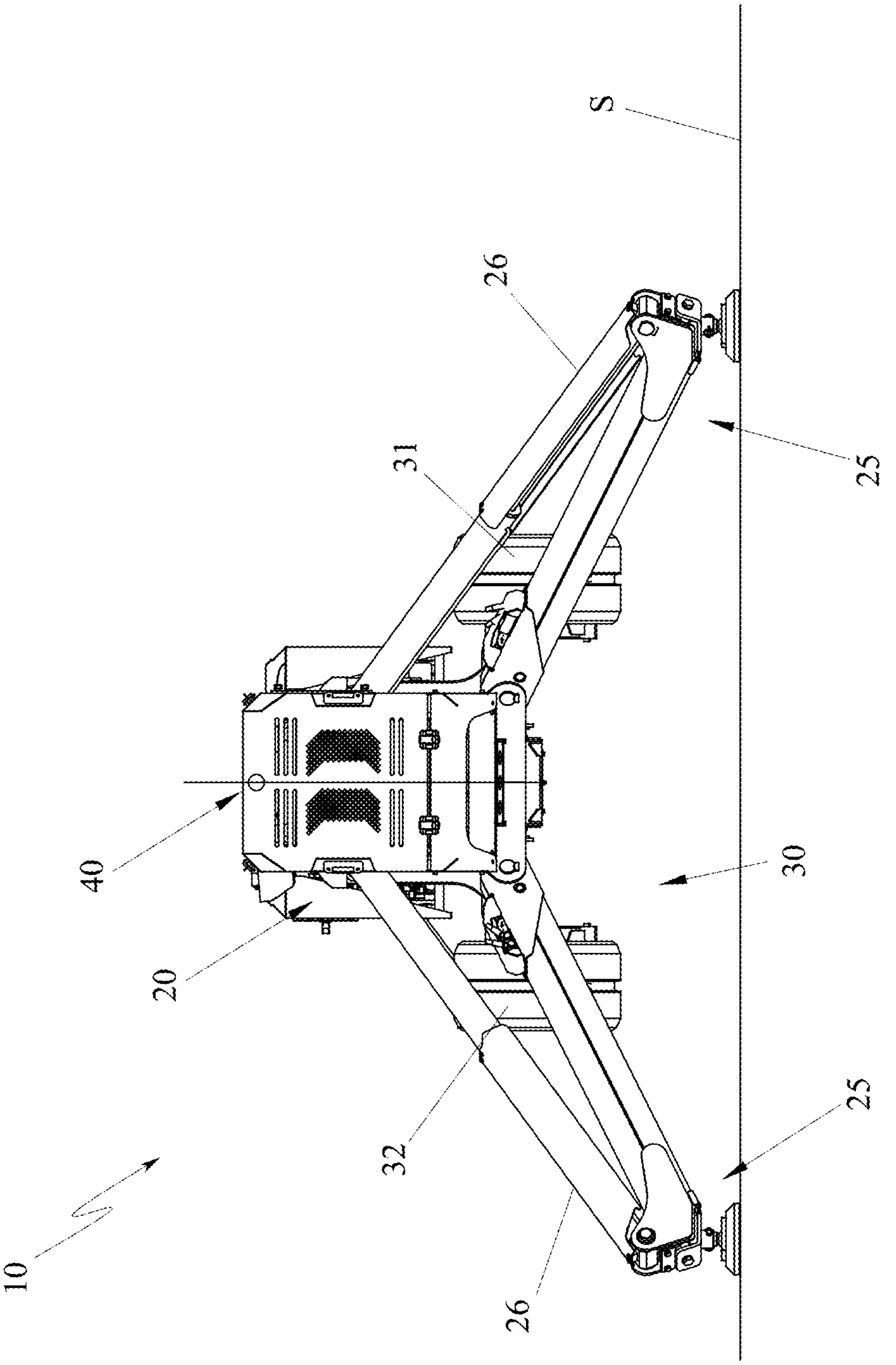
FIG. 5 is a rear front view of FIG. 2.
Figure 6:
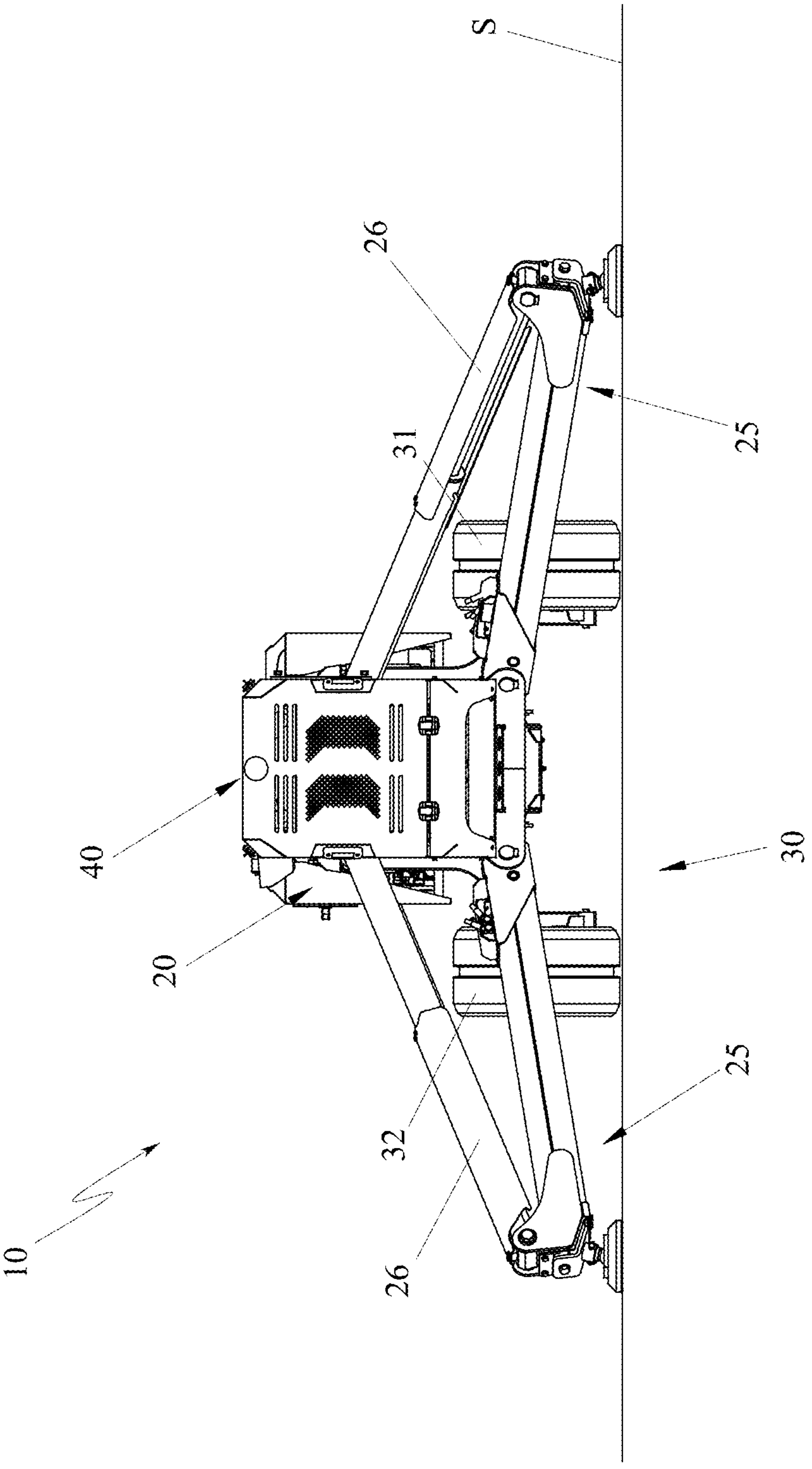
FIG. 6 is a rear front view of FIG. 3.
Figure 7:
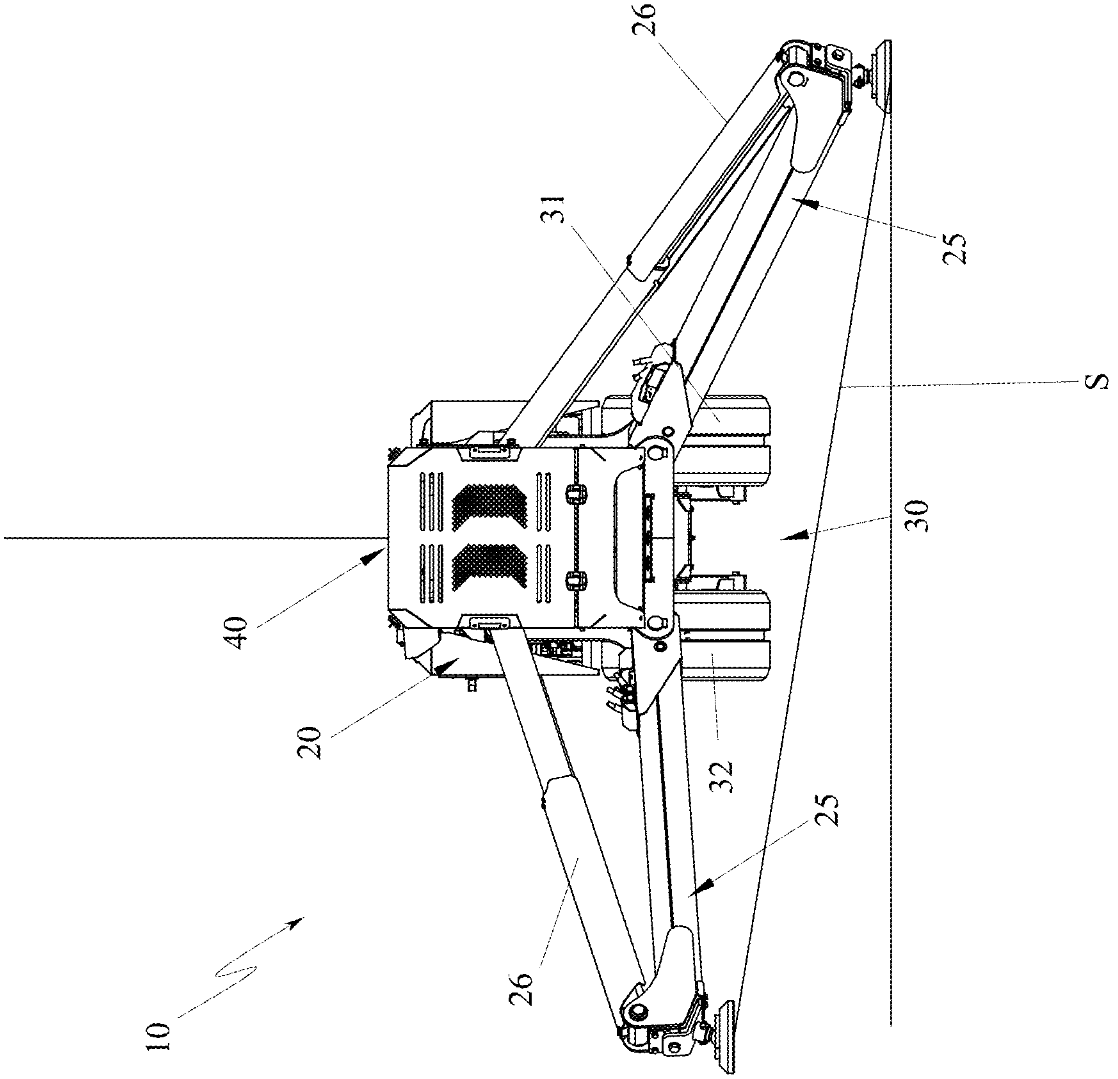
FIG. 7 is a rear front view of FIG. 4.

In practice, each stabilizer 25 is configured to be stopped in a plurality of working positions, for example between two limit working positions, of which a lower limit working position (see FIGS. 2 and 5), wherein the stabilizer 25 is at its lower end of stroke, i.e., is distal from (and placed inferiorly to) the lower surface 21 of the base frame 20 and/or the lower surface of the track arrangement proximal thereto (and/or the second aforesaid distance is maximum), and an upper limit working position (see FIGS. 3 and 6), wherein the stabilizer 25 is proximal to (and placed inferiorly to) the lower surface 21 of the base frame 20 and/or the lower surface of the track arrangement proximal thereto (and/or the aforesaid second distance is minimum, or at most zero).

Each stabilizer 25, at least in each working position or only in each working position, protrudes laterally and/or longitudinally beyond the lateral and/or longitudinal (in plan) overall volume of the base frame 20 and, preferably, also of the track arrangements 31,32 (even when they are in their enlarged position).

In the example, each stabilizer 25 comprises a ground support foot disposed at the free end of a support arm, which has an opposed end constrained to the base frame 20, for example with a constraint such that the support arm has at least one degree of freedom.

Preferably, (the constrained end of) the support arm is rotatably coupled to the base frame 20, for example by means of a hinge defining said axis of oscillation.

In the shown example, each stabilizer 25 is associated with the base frame 20 by means of a constraint such that only one degree of (rotational) freedom is left for the support arm.

It is not excluded that in certain circumstances, it can be envisaged that each stabilizer 25 can be associated with the base frame 20 by means of a constraint such as to leave two rotational degrees of freedom to the support arm, one of which around the aforesaid axis of oscillation and the other around an axis of revolution orthogonal to the support plane defined by the upper surface 22.

In the example, the machine 10 comprises four stabilizers 25, of which two front stabilizers (one right and one left) and two rear stabilizers (one right and one left). In the example, each stabilizer 25 in its working position protrudes laterally and longitudinally (anteriorly or posteriorly, depending on whether it is a front or rear stabiliser) from the base frame 20 (and from the proximal track arrangement 31, 32).

Figure 8:
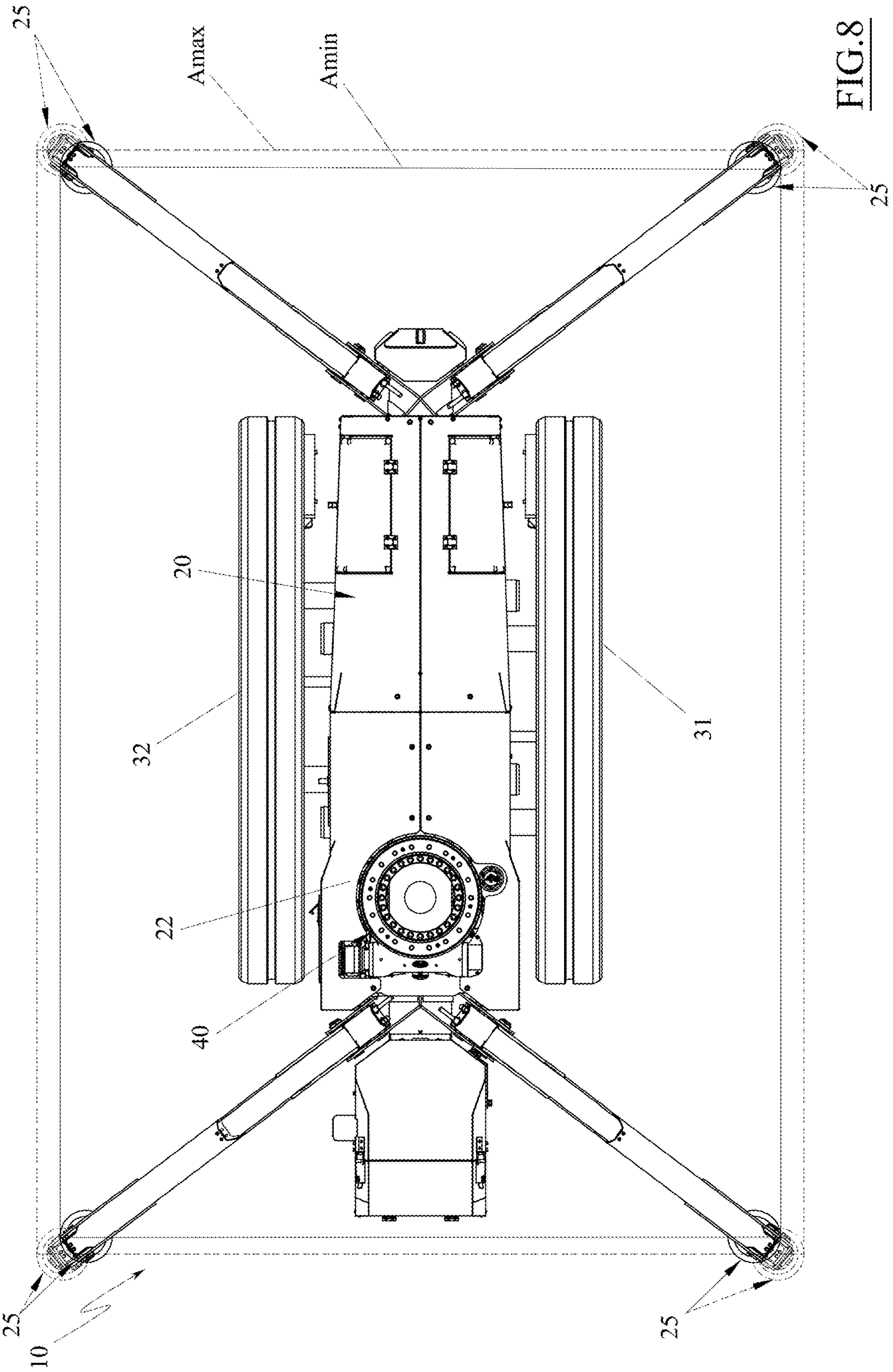
FIG. 8 is a top view of FIG. 3 (with the dashed stabilizers from the view of FIG. 2).
Figure 9:
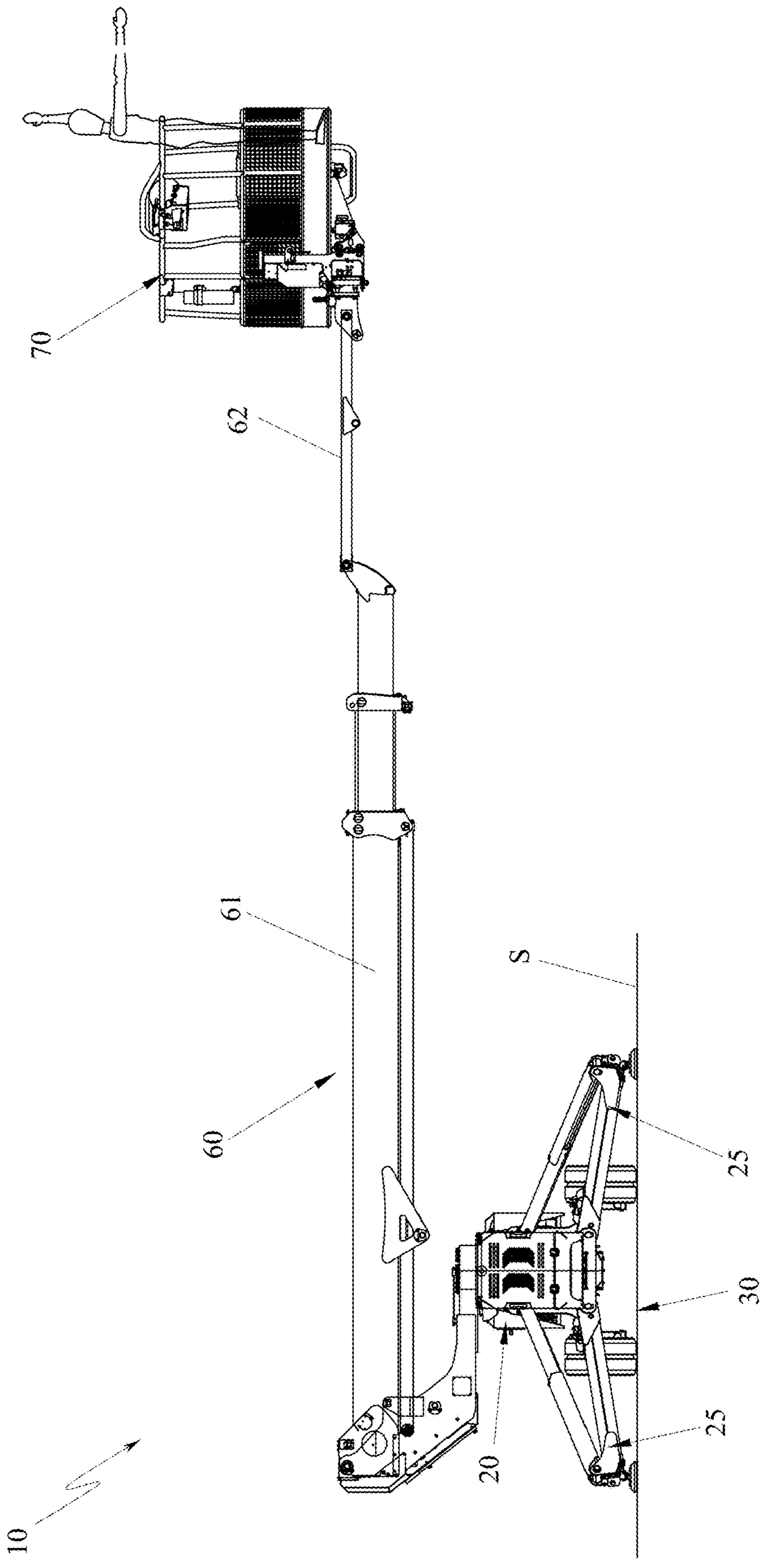
FIG. 9 is a rear view of a stabilized machine (showing the elevating arm supporting a nacelle), wherein the stabilizers are in an upper limit working position and the elevating arm is in a position of maximum extension allowed for said upper limit working position.
Figure 10:
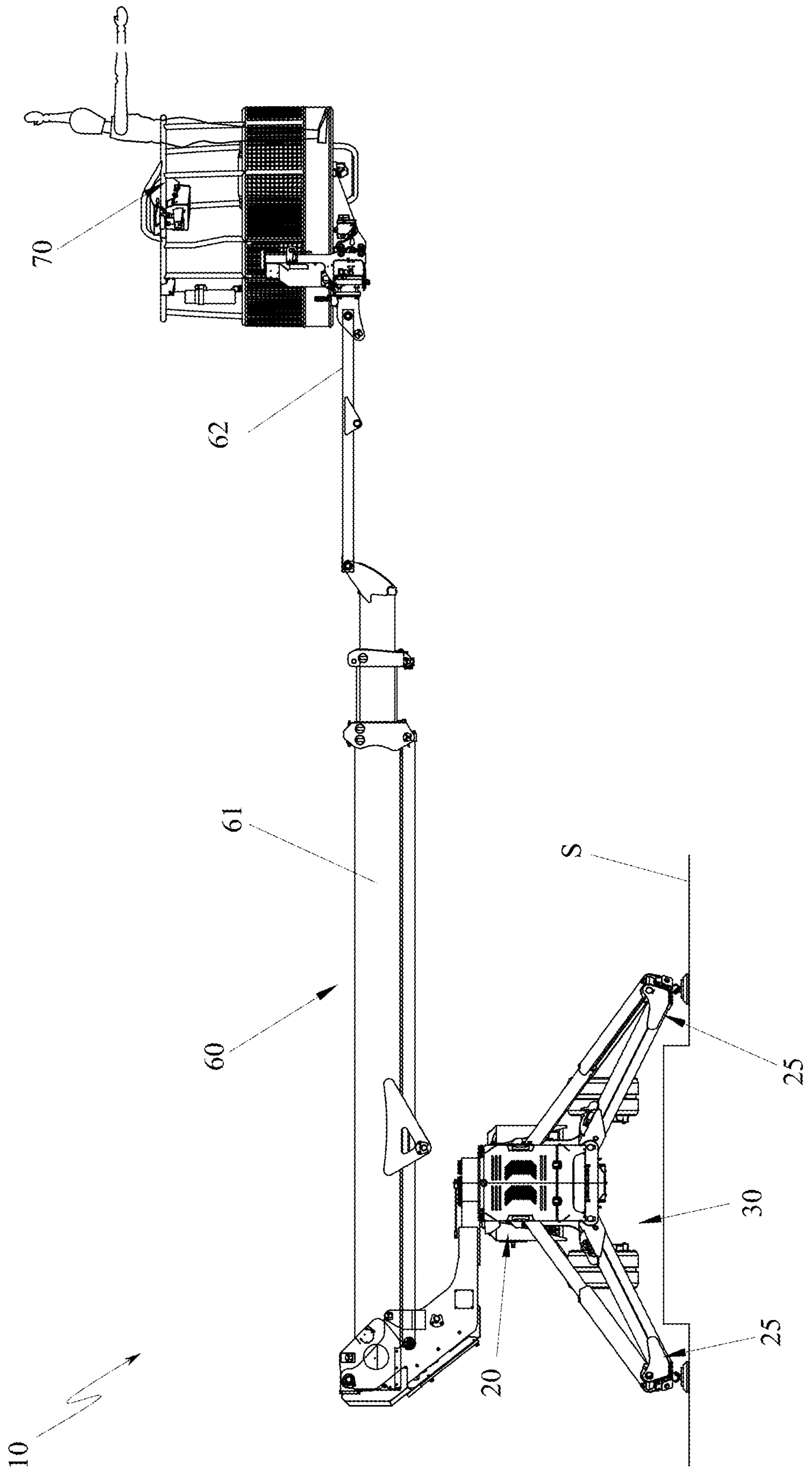
FIG. 10 is a rear view of the machine of FIG. 9, wherein the stabilizers are in a lower limit working position and the elevating arm is in a position of maximum extension allowed for said lower limit working position, wherein the allowed extension stroke with the stabilizers in a lower limit working position is lower than the allowed extension stroke with the stabilizers in an upper limit working position of FIG. 9.
Figure 11:
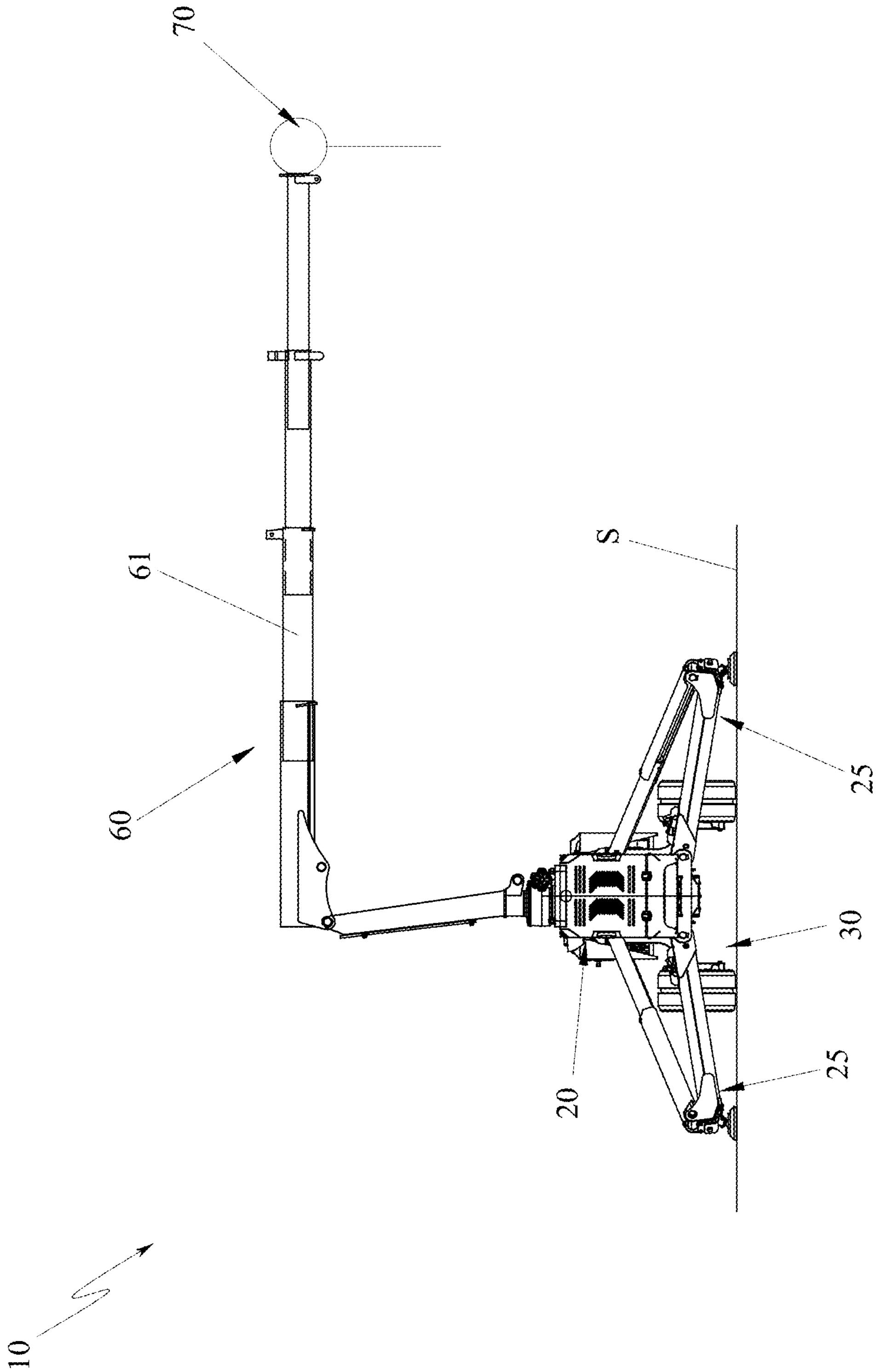
FIG. 11 is a rear view of a stabilized machine (showing the elevating arm supporting a winch), wherein the stabilizers are in an upper limit working position and the elevating arm is in a position of maximum extension allowed for that upper limit working position.
Figure 12:
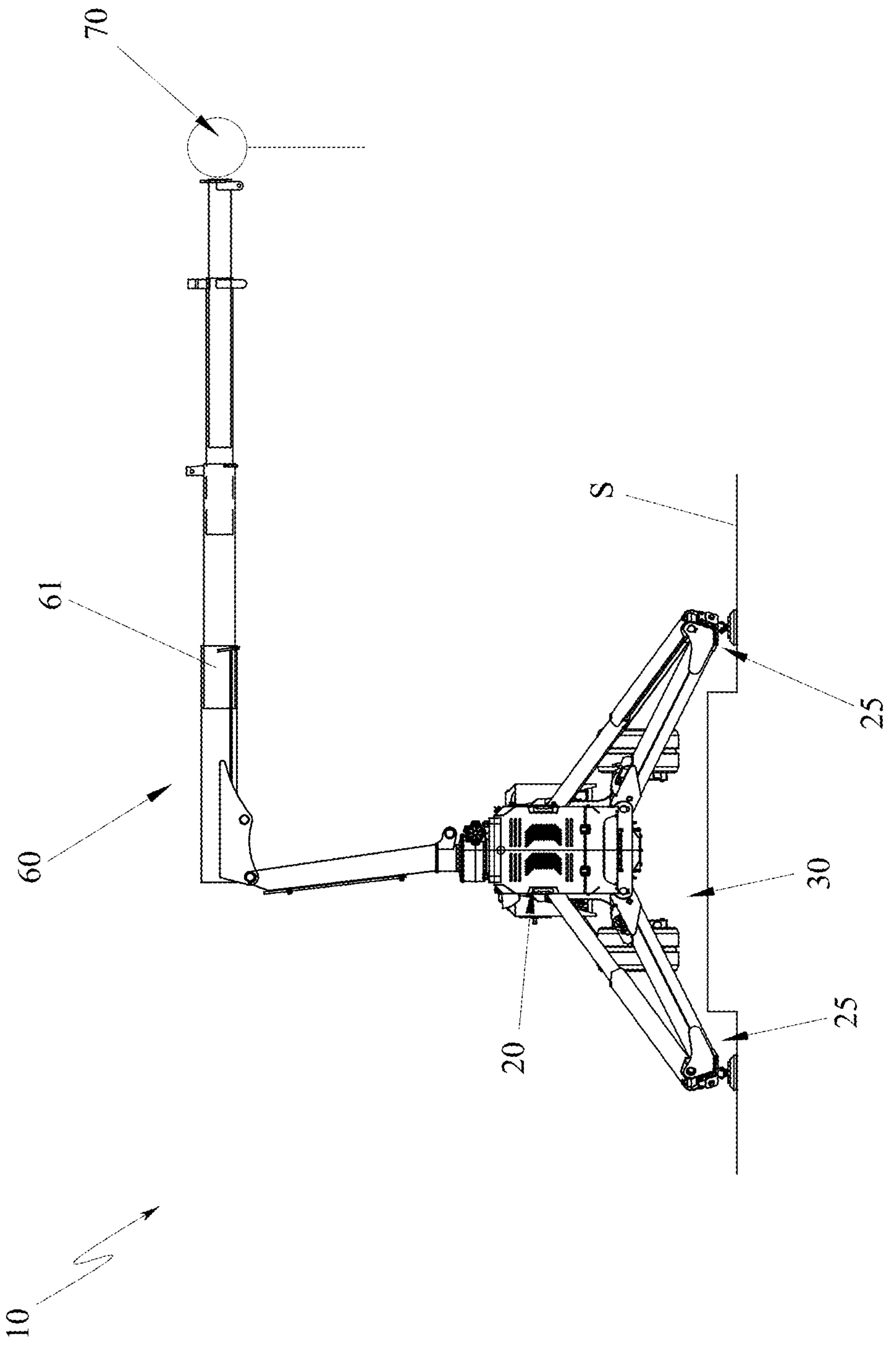
FIG. 12 is a rear view of the machine of FIG. 11, wherein the stabilizers are in a lower limit working position and the elevating arm is in a position of maximum extension allowed for said lower limit working position, wherein the allowed extension stroke with the stabilizers in a lower limit working position is lower than the allowed extension stroke with the stabilizers in an upper limit working position of FIG. 11.

In practice, when each of the stabilizers 25 is in any working position, the support feet thereof are positioned at the vertices of an imaginary quadrilateral (for example, a rectangle, see FIG. 8), the dimensions (area and shape) of which vary, depending on the working positions assumed by the stabilizers 25.

For example, such an imaginary quadrilateral has a minimum area (indicated schematically by Amin in FIG. 8) when all stabilizers 25 are in their lower limit working position and has a maximum area (indicated schematically by Amax in FIG. 8) when all stabilizers 25 are in their upper limit working position.

The area of the imaginary quadrilateral, therefore, is variable between the minimum area and the maximum area, as the working positions assumed by the stabilizers 25 vary between the lower limit working position and the upper limit working position.

In the rest position, however, each stabilizer 25 is contained within the lateral and longitudinal overall volume of the base frame 20.

Each stabilizer 25 further comprises, an actuator 26, which is configured to alternately move the stabilizer 25 between any one of the working positions and the rest position, for example by stopping the stabilizer 25 in one of them stably. Preferably, each actuator 26 is defined by a (hydraulic or pneumatic) jack comprising a cylinder hinged to one between the base frame 20 and the stabilizer 25 (e.g., the stabilizer 25) and a removable rod hinged to the other between the stabilizer 25 and the base frame 20 (e.g., the base frame 20), wherein the hinge axes of each jack are parallel to the axis of oscillation of the respective stabilizer 25.

The machine 10 further comprises a motorized turntable 40 supported on top of the base frame 20, for example on top of the support plane defined by the upper surface 22 thereof.

The turntable 40 comprises a (single) central axis of rotation orthogonal to the support plane defined by the upper surface 22 of the base frame 20.

The turntable 40, for example, comprises a first lower ring (rigidly fixed to the upper surface 22 of the base frame 20), which is rotatably coupled to a second upper ring with respect to said (single) axis of rotation.

The turntable 40 further comprises an electric motor provided with an encoder, which is configured to rotatably drive the second ring with respect to the first ring (and is supported by the first ring) about the axis of rotation, for example by an angle of (at least) 360° (or greater).

The machine 10 further comprises an elevating arm 60 (see FIGS. 9-12), that is, configured to be raised and lowered with respect to the ground S.

For example, the elevating arm 60 is of the extendable type, the term "extendable" being understood in a general sense meaning that it is capable of extending its length or can be implemented alternately between a contracted configuration and an extended configuration, for example in a telescopic manner or in an articulated manner or by means of a combination of telescopic and articulated connections.

The elevating arm 60 is carried by the turntable 40, i.e., by the second ring thereof, by interposition of a support base, which is rigidly fixed (e.g., by bolts) on top of the second ring thereof and, for example, is provided with counterweights. The elevating arm 60 comprises, in the example, a first arm section 61, a first end of which (proximal to the turntable 40) is articulated to the support base (and therefore to the turntable 40) so as to be able to oscillate with respect thereto about a (single) axis of articulation, which is (always) orthogonal to the axis of rotation of the turntable 40.

In practice, the first end of the first section 61 (i.e., the elevating arm 60) is hinged to the support base by means of a hinge pin defining said axis of articulation.

The first section 61 of the elevating arm 60 is rotatable about its axis of articulation between two distinct end-of-stroke positions, of which a first lower rest position, in which the first section 61 lies on a plane substantially orthogonal to the axis of rotation of the turntable 40, a second upper operational position, in which the first section 61 is arranged with longitudinal development substantially parallel to the axis of rotation of the turntable 40.

The first section 61 of the elevating arm 60 is, in the example, telescopic (with two or more stretches).

In particular, the first section 61 comprises a first (outer) stretch, which has a first end (defining the first end of the same first section) hinged, as described above, to the support base and at least a second (inner) stretch, which is slidably coupled to the first stretch and comprises a first end inserted into the first stretch and a second free end.

The second stretch is slidable within the first stretch between two end-of-stroke positions, of which a first retracted position, wherein the second end of the second stretch is proximal to a second (free) end of the first stretch, and a second extracted position, wherein the second end of the second stretch is distal from the second (free) end of the first stretch.

In the example, the first section 61 of the elevating arm 60 further comprises a third (inner) stretch, which is in turn slidably coupled to the second stretch and comprises a first end inserted into the second stretch and a second free end.

The third stretch is also slidable within the second stretch between two end-of-stroke positions, of which a first retracted position, wherein the second end of the third stretch is proximal to the second (free) end of the second stretch, and a second extracted position, wherein the second end of the third stretch is distal from the second (free) end of the second stretch.

The second end of the last stretch of the series of stretches defining the first section 61 of the elevating arm 60, in the example of the third stretch, actually defines the second end of the same first section 61.

The second stretch (as well as the third stretch), i.e., each stretch of the first section 61 (except for the first stretch) is thus alternately movable between the respective retracted position and the respective extracted position.

Thus, the first section 61 is, overall, operable between a retracted configuration (of maximum contraction), which is defined when all of the stretches of which the first section 61 is composed are in their retracted position, and an extended configuration (of maximum extension), which is defined when all of the stretches of which the first section 61 is composed are in their extended position.

The elevating arm 60, for example, may further comprise a second arm section 62, which preferably comprises a first end constrained to the second (free) end of the first arm section 61 and an opposed free end.

For example, the second section 62, also referred to as an antenna or JIB, is articulated to the first section 61 by means of at least one connecting axis parallel to the axis of articulation that constrains the first section 61 to the turntable 40 (i.e., to the support base).

In the example, the second section 62 is defined by an articulated quadrilateral, wherein all connecting axes are parallel to each other and parallel to the axis of articulation.

The second section 62 is movable about one or more connecting axes between a first working position, in which it is substantially squared to the first section 61 (e.g., parallel thereto), and a second working position, in which it is substantially aligned with and axially extends the first section 61.

The machine 10 comprises, then, a first drive arrangement configured to rotatably drive the elevating arm 60, i.e. (the first stretch of) the first section 61, about its axis of articulation between the two distinct end-of-stroke positions.

The first drive arrangement comprises a first hydraulic jack, provided with a rod slidably movable inside a cylinder, wherein the rod in the example is hinged to the support base about a hinge axis parallel and eccentric to the axis of articulation and the cylinder is hinged to the first section 61 (i.e., the first stretch thereof) about a hinge axis parallel and eccentric to the axis of articulation, for example at two anchor ears located near an intermediate zone between the first end and the second end of the first stretch itself.

The first drive arrangement comprises a respective hydraulic circuit, for example contained in the casing located on the upper surface 22 of the base frame 20, for actuating the first hydraulic jack, between an extended configuration, in which the rod is in a position extracted from the cylinder, and a retracted configuration. The variation of the first hydraulic jack between the extended configuration and the retracted configuration allows the rotation of the elevating arm 60 as a whole with respect to the turntable 40 (i.e. with respect to the support base), respectively between the second upper position and the first lower position thereof.

When the first hydraulic jack is in the retracted configuration, the elevating arm 60 as a whole (i.e., the first section 61) is in its first lower position. Otherwise, when the first hydraulic jack is in the extracted configuration, the elevating arm 60 as a whole is in its second upper position. Obviously, the first hydraulic jack (and the respective hydraulic circuit) is configured to carry (and support) the elevating arm 60 also in any position that is intermediate between the first lower position and the second upper position.

The machine 10 comprises, then, a second drive arrangement configured to drive in extension (and contraction) the elevating arm 60.

For example, the second drive arrangement comprises a first linear actuator (or a plurality of first linear actuators), which is configured to drive in extension and contraction the first section 61 of the elevating arm 60.

The first linear actuator is, preferably, contained within (the box-like structure) of the first section 61.

The first linear actuator comprises a respective hydraulic circuit, for example contained in the casing located on the upper surface 22 of the base frame 20, for actuating the first linear actuator between an extended configuration and a retracted configuration. The variation of the first linear actuator between the extended configuration and the retracted configuration allows the first section 61 to be switched between its extended configuration (of maximum extension) and its retracted configuration (of maximum contraction).

Obviously, the first linear actuator (and respective hydraulic circuit) is configured to move the first section 61 of the elevating arm 60 into any configuration that is intermediate between the extended configuration and the retracted configuration.

The machine 10 further comprises a third drive arrangement, which is configured to rotatably drive the second section 62 of the elevating arm 60 with respect to the first section 61.

The third drive arrangement comprises, for example, second linear actuator provided with a slidably movable rod within a cylinder, wherein the rod in the example is hinged to the second free end (of the third stretch) of the first section 61 about a hinge axis parallel and eccentric to the connecting axis and the cylinder is hinged to the second section 62 about a hinge axis parallel and eccentric to the connecting axis, for example, at two anchor ears located near a zone that is intermediate between the first end and the second end of the second section 62 itself.

The third drive arrangement comprises a hydraulic circuit, for example contained in the casing located on the upper surface 22 of the base frame 20, for actuating the second linear actuator between an extended configuration, in which the rod is in a position extracted from the cylinder, and a retracted configuration. The variation of the second linear actuator between the extended configuration and the retracted configuration allows the rotation of the second section 62 with respect to the first section 61 of the elevating arm 60, respectively, between the second working position and the first working position thereof.

When the second linear actuator is in the retracted configuration, the second section 62 is in its first working position. Otherwise, when the second linear actuator is in the extracted configuration, the second section 62 is in its second working position. Obviously, the second linear actuator (and the respective hydraulic circuit) is configured to move (and support) the second section 62 to any position that is intermediate between the first working position and the second working position.

The machine 10 further comprises an operating arrangement 70, which is configured to be supported at the free end of the elevating arm 60.

The operating arrangement 70 may comprise or consist of a nacelle intended to support and transport one or more persons (and, thus, the machine 10 is configured as an aerial platform).

In such a case, the second end of the second section 62, i.e., the second free end of the elevating arm 60 as a whole, comprises a coupling or connection attachment (for example, provided with a joint with an axis parallel to the axis of rotation of the turntable 40), which is intended to be connected, in a releasable manner, to the nacelle.

The nacelle is hinged to a free end of the second section 62 about a hinge axis parallel to the axis of articulation of the first section 61.

Alternatively, the operating arrangement 70 may comprise or consist of a winch, such as a motorized winch, or other load lifting system, such as a hook, clamp, gripper, or the like (and, thus, the machine 10 is configured as a crane).

In such a case, the second section 62 may not be present and, the free end of the first section 61, may be directly connected to the load lifting system.

For example, the machine 10 may be variously configured and modified by providing the possibility to selectively couple the nacelle and the load lifting system to the free end of the elevating arm 60.

The machine 10 further comprises a control system 80 (schematically shown in FIG. 13), which is configured to control the operation of the machine itself.

In the embodiment considered, the control system 80 comprises a controller module 81, a sensor arrangement 82 and, optionally, a user interface 83.

In particular, the controller module 81 comprises an electronic control unit 810 (for example, comprising at least one of a microcontroller, a microprocessor, an FPGA, an ASIC, etc.) and, optionally, a storage unit 811 (comprising, non-volatile memory elements and, preferably, volatile memory elements) interconnected with each other and adapted to process and store, respectively, information—for example, in binary format.

The sensor arrangement 82 comprises, for example, an orientation sensor, e.g., mounted on the turntable or on the base frame 20, configured to detect an orientation of the base frame 20 with respect to a zero position at which the base frame 20 is supported on the ground (i.e., the ground support plane defined by the track arrangement 31 and 32) is substantially horizontal.

Orientation, for example, means an absolute orientation with respect to an absolute reference system defined by a horizontal plane (x,y) and a vertical axis (z).

The sensor arrangement 82 comprises, for example, also a first angle sensor, which is for example mounted on the turntable 40 and is configured to detect, with respect to a zero angular position, a relative angular position between the first ring and the second ring of the turntable 40.

For example, the zero angular position is defined at a position whereby the elevating arm 60 is superimposed in plan on the base frame 20 and substantially centred thereon, i.e., lying on a longitudinal median plane of the base frame 20. For example, the first angle sensor is defined by the encoder of the electric motor of the turntable 40.

Still, the sensor arrangement 82 may further comprise a second angle sensor, for example mounted on one between the base frame 20 and the first section 61 of the elevating arm 60, which is configured to detect an angular position (of the first section 61) of the elevating arm 60 with respect to the turntable 40 (i.e., with respect to the base frame 20) about the axis of articulation from the first lower position (assumed as zero position).

The sensor arrangement 82 further comprises an extension sensor, for example mounted on the first section 61 of the elevating arm 60, which is configured to detect an extension (of the first section 61) of the elevating arm 60 with respect to the retracted configuration thereof (assumed as zero position).

Still, the sensor arrangement 82 may comprise a third angle sensor, for example mounted on one between the first section 61 and the second section 62 of the elevating arm 60, which is configured to detect an angular position of the second section 62 with respect to the first section 61 about the connecting axis with respect to the first working position (assumed as zero position).

In addition, the sensor arrangement 82 may comprise a fourth angle sensor, for example mounted on the coupling or connection attachment, which is configured to detect an angular position of the operating arrangement 70 with respect to the second section 62 around the axis of the joint defined by the coupling or connection attachment with respect to an alignment position (assumed as zero position).

Finally, the sensor arrangement 82 may comprise a load sensor, such as a load cell, mounted on at least one between the operating arrangement 70 and the coupling or connection attachment (or the second section 62), which is configured to detect a load weighing on the operating arrangement 70 (e.g., supported by it or intended to be lifted by it).

The sensor arrangement 82 comprises a plurality of inclination sensors 825, one for each stabilizer 25, wherein each inclination sensor 825 is configured to detect an inclination of the respective stabilizer about the axis of oscillation thereof with respect to the base frame 20.

For example, each inclination sensor 825 (mounted on the respective stabilizer 25) is configured to detect an absolute inclination of the respective stabilizer 25 with respect to an absolute reference system defined by a horizontal plane (x,y) and a vertical axis (z).

As an alternative to or in addition to the inclination sensor 825, the sensor arrangement may include a plurality of position sensors, one for each stabilizer 25, configured to detect a reciprocal position between the cylinder and the rod of the jack of the actuator 26 of the respective stabilizer 25.

Further, the sensor arrangement 82 may include a plurality of pressure sensors 826, one (or more) for each stabilizer 25, that is one or more pressure sensors 826 for each actuator 26, each of which is located at the respective actuator 26.

Each pressure sensor 826 is configured to detect a support pressure of the respective stabilizer 25, so as to define when it transitions from a rest position to the upper limit working position and/or any working position.

As an alternative or in addition to the pressure sensors 826, the sensor arrangement 82 may include a load cell and/or one or more limit switches (so-called "micro") for each stabilizer 25.

The sensors of the sensor arrangement 82 globally are individually operatively connected to the controller module 81 and, preferably, to the electronic control unit 810 thereof.

Finally, if provided, the user interface 83 may comprise an input module for receiving instructions from an operator and an output module for providing the operator with information. The user interface 83 may be integrated into the machine 10, for example at the casing or nacelle, and/or be separate or separable therefrom. Accordingly, the user interface 83 may be wired to the controller module 81 and/or comprise a transceiver element for communicating with a corresponding transceiver element (not shown) included in the controller module 81.

The control system 80, i.e., the electronic control unit 810, is also operatively connected to each motor of the respective track arrangement 31 and 32 to drive the movement thereof on the ground S.

A "movement" or "handling" of the machine 10 on the ground S is understood herein as a translation displacement of the machine 10 (i.e. of its base frame 20) along a trajectory controlled by the user, for example by means of the user interface 83 and the controller module 81, for example by means of the command of the actuation (by the controller module 81) of the motors (individually or simultaneously) of the respective track arrangements 31 and 32.

The control system 80, i.e., the electronic control unit 810, is also operatively individually connected to the first drive arrangement, the second drive arrangement, the third drive arrangement, and the fourth drive arrangement.

The machine 10 is operable in a controlled manner, by means of the control system 80, as will be better described below.

For example, the machine 10 is operable in a controlled manner by moving the elevating arm 60 when the stabilizers 25 are in any working position.

In particular, the stabilizers 25 are moved to a desired working position, for example, by a command from an operator.

The electronic control unit 810 is configured to measure a pressure value on each stabilizer 25, via the respective pressure sensor 826.

At this point, the electronic control unit 810 compares each pressure value with a certain reference pressure value, for example obtained by calibration and stored in the storage unit 811.

The reference pressure value is, for example, a pressure value that is a function of the weight of the machine 10.

If the measured pressure value is greater than the reference pressure value, then, the electronic control unit 810 identifies the stabilizer 25 as (actually) supported on the ground.

In parallel, the control system 80 is configured such that the base frame 20 is always arranged with the support plane defined by the upper surface in a horizontal position, i.e. with the axis of rotation of the turntable 40 in a vertical position.

When the stabilizers 25 are stationary in a respective desired working position, the control system 80 is configured to operate the elevating arm 60 by controlling its stabilization, as will be more fully described below.

With particular reference to the flowchart in FIG. 14, a control performed by the electronic control unit 810 is described below.

In particular, the electronic control unit 810 is configured to measure (block S1), via each inclination sensor 825 and/or via the position sensor, a respective value of a first parameter indicative of the inclination of each stabilizer 25.

For example, the first indicative parameter may be the value of the absolute inclination of the stabilizer 25 or the relative position between the cylinder and the rod of the actuator 26.

For example, the electronic control unit 810 is configured to determine/calculate (block S2) an actual value of a second parameter that is indicative of a ground support area S defined by the stabilizers 25 as a function of the measured values of the first indicative parameter.

Essentially, the electronic control unit 810 is configured to determine/calculate a value of a lateral distance of each stabilizer 25 (i.e., each support foot thereof) from a longitudinal (vertical) plane of the base frame 20 that contains the axis of rotation of the turntable 40 (and is orthogonal to the axis of rotation of the track arrangements 31 and 32) and/or a value of a front distance of each stabilizer 25 (i.e., each foot of support thereof) from a transverse (vertical) plane of the base frame 20 that contains the axis of rotation of the turntable 40 (and is parallel to the axis of rotation of the track arrangements 31 and 32).

Based on such lateral distance values and such frontal distance values, in essence, the electronic control unit 810 determines/calculates an actual value of the ground support area (as the area of the quadrilateral having vertices at the stabilizer support feet 25).

At this point, the electronic control unit 810 is configured to control (block S3) at least one operational parameter, chosen in the set among elevating arm extension stroke 60 (i.e. of the first section 61 thereof), elevating arm articulation arc 60 (i.e. of the first section 61 with respect to the base frame 20 and/or of the second section 62 with respect to the first section 61), elevating arm rotation arc 60, for example about the axis of rotation of the turntable 40, and combinations thereof, based on the measured values of the first indicative parameter and/or based on the actual value of the second indicative parameter of the ground support area S defined by the stabilizers 25.

In particular, the electronic control unit 810 is configured to determine (block S4) a maximum extension stroke of the elevating arm 60 for each set of values of the first measured indicative parameter (in the given selected working position) and/or the second determined indicative parameter.

For example, the maximum extension stroke of the elevating arm 60, i.e., the first section 61, is determined by the electronic control unit 810 as the output of one (or more) pre-calibrated map stored in the storage unit 811 which receives as input the set of values of the first measured indicative parameter (e.g., each measured angle/position value) and/or the set of values of the second determined indicative parameter (e.g., each determined/calculated distance value or the determined/calculated support area value).

Such a pre-calibrated map can be predetermined during experimental activities studied as a function of structural calculations in various working configurations.

For example, the electronic control unit 810 is such as to determine:

- a minimum value of maximum extension stroke allowed to the elevating arm 60 at a specified minimum actual value of support area, calculated when the stabilizers 25 are all in their lowest limit working position;
- a maximum value of maximum extension stroke allowed to the elevating arm 60 at a specified maximum actual value of support area, calculated when the stabilizers 25 are all in their lowest limit working position; and
- a multiplicity of intermediate values of maximum extension stroke allowed to the arm 60 for the working positions 25 of the stabilizers that are intermediate between the lower limit working position and the upper limit working position.

The control system 80, therefore, for the given maximum extension stroke value allows the actuation of the second drive arrangement (e.g. by the operator) for extension stroke values lower than or equal to the determined maximum extension stroke value of the extension stroke 60 of the elevating arm and, therefore, inhibits the actuation of the second drive arrangement in actuating the elevating arm 60 for extension strokes greater than the determined maximum value of the extension stroke of the elevating arm 60.

In practice, the control system 80 allows the extension of the elevating arm 60 within a stability area determined based on the actual value of the ground support area, inhibiting the extension of the elevating arm 60 beyond extension values that would be critical to the gravitational stability of the machine 10.

In other words, the control system 80, i.e., the electronic control unit 810, is configured to dynamically determine the value of maximum extension stroke allowed to the elevating arm 60, which value of maximum extension stroke is variable depending on the variation of the support area of the stabilizers 25.

The higher the actual ground support area defined by the stabilizers 25 (stationary in a given actual working position), the higher the maximum extension stroke value allowed to the elevating arm 60 in such configuration.

In addition, the control system 80 may also be configured to take into account the load weighing on the operating arrangement 70.

In particular, the aforementioned value of maximum extension stroke allowed to the elevating arm 60 can be, moreover, determined/corrected as a function of a load acting on the operating arrangement 70.

In particular, the control system 80 may be configured to measure a value of a load acting on the operating arrangement 70.

In this case, said value of load acting on the operating arrangement can be used as a further input of the aforementioned map for determining, as an output, the value of maximum extension stroke allowed to the elevating arm 60 in said configuration of the stabilizers 25.

For example, a map may be defined for each (discrete) point of the variables which are then interpolated by the control system 80 to find the output corresponding to the measured/determined inputs or, alternatively, a map may be provided for each possible input.

Alternatively or additionally, the electronic control unit 810 is configured to determine (block S5) a permissible arc of articulation (and/or limit values of a permissible arc of articulation) of the elevating arm 60 for each set of values of the first measured indicative parameter (in the given selected working position). For example, the permissible arc of articulation (and/or the limit values of a permissible arc of articulation) of the elevating arm 60, i.e. of the first section 61 and/or the second section, is determined by the electronic control unit 810 as the output of one (or more) pre-calibrated map stored in the storage unit 811 that receives as input the set of values of the first measured indicative parameter (e.g., each measured angle/position value) and/or the set of values of the second determined indicative parameter (e.g., each determined/calculated distance value or determined/calculated support area value).

Such a pre-calibrated map can be predetermined during experimental activities studied as a function of structural calculations in various working configurations. In addition, the electronic control unit 810 can be configured to determine (block S6) a permissible arc of rotation (and/or limit values of a permissible arc of rotation) of the elevating arm 60 for each set of values of the first measured indicative parameter (in the given selected working position).

For example, the permissible arc of rotation (and/or the limit values of a permissible arc of rotation) of the elevating arm 60, i.e., of the first section about the axis of rotation of the turntable 40, is determined by the electronic control unit 810 as the output of one (or more) pre-calibrated map stored in the storage unit 811 that receives as input the set of values of the first measured indicative parameter (e.g., each measured angle/position value) and/or the set of values of the second determined indicative parameter (e.g., each determined/calculated distance value or determined/calculated support area value).

Such a pre-calibrated map can be predetermined during experimental activities studied as a function of structural calculations in various working configurations. Thus, the electronic control unit 810 is configured to operate the elevating arm 60 within the extension and/or articulation and/or rotation limits defined by the maximum extension stroke and/or the permissible arc of articulation and/or the permissible arc of rotation determined.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A stabilized machine that comprises;

a self-propelled base frame movably supported by a motorized ground support arrangement and provided with an upper support plane;

a motorized turntable supported on top of the support plane of the base frame and rotatable with respect to an axis of rotation orthogonal to the support plane;

an elevating arm, one first end of which is articulated to the turntable and one second opposed free end of which is adapted to be fixed to an operating arrangement;

a plurality of stabilizers each of which is rotatably associated with the base frame about an axis of oscillation lying on a plane orthogonal to the axis of rotation of the turntable, alternatively between a working position, in which it is supported on the ground in addition to or as an alternative to the support arrangement, and a rest position, in which it is raised off the ground;

a control system comprising a plurality of sensors, one for each of the stabilizers, wherein each sensor is configured to detect a first parameter indicative of an inclination of the respective stabilizer about its axis of rotation, and an electronic control unit operatively coupled to the plurality of sensors.

2. The machine according to claim 1, wherein the electronic control unit is configured to:

measure a value of said first parameter indicative of each stabilizer, when the relative stabilizer is stationary in a working position; and check at least one operational parameter, chosen from the set among elevating arm extension stroke, elevating arm articulation arc, elevating arm rotation arc and combinations thereof, based on the measured values of the first indicative parameter.

3. The machine according to claim 2, wherein the electronic control unit is configured to:

determine an actual value of a second parameter indicative of a ground support area defined by the stabilizers or by the stabilizers and the ground support arrangement as a function of the measured values of the first indicative parameter; and determine at least a maximum value of the operational parameter based on the actual value determined.

4. The machine according to claim 1, wherein each sensor is an angle sensor, configured to detect an absolute inclination of the respective stabilizer.

5. The machine according to claim 1, wherein each sensor is a position sensor, configured to detect a relative position between a cylinder and a rod of a jack driving the respective stabilizer.

6. The machine according to claim 1, wherein each stabilizer comprises a pressure sensor operatively connected to the electronic control unit, wherein the electronic control unit is configured to detect the attainment of a working position based on a signal received from the pressure sensor.

* * * * *